United States Patent [19]

Masumoto et al.

[11] Patent Number: 5,424,953
[45] Date of Patent: Jun. 13, 1995

[54] NAVIGATION APPARATUS

[75] Inventors: Yutaka Masumoto; Satoshi Odagawa, both of Kawagoe, Japan

[73] Assignee: Pioneer Electronic Corporation, Tokyo, Japan

[21] Appl. No.: 4,241

[22] Filed: Jan. 14, 1993

[30] Foreign Application Priority Data

Jan. 16, 1992 [JP] Japan .................................. 4-005844
Jan. 16, 1992 [JP] Japan .................................. 4-005845

[51] Int. Cl.$^6$ .......................................... G06F 165/00
[52] U.S. Cl. ..................................... 364/449; 364/453; 340/988; 340/995
[58] Field of Search ............... 364/449, 450, 453, 454, 364/457, 424.05; 73/178 R; 33/356, 357; 340/988, 990, 995; 342/450, 451, 457

[56] References Cited

U.S. PATENT DOCUMENTS

| | | | |
|---|---|---|---|
| 4,734,863 | 3/1988 | Honey et al. | 364/449 |
| 5,065,325 | 11/1991 | Takahashi | 364/424.05 |
| 5,067,083 | 11/1991 | Nakayama et al. | 340/995 |
| 5,115,238 | 5/1992 | Shimizu et al. | 364/449 |
| 5,122,960 | 6/1992 | Ooka | 364/453 |
| 5,235,514 | 8/1993 | Matsuzaki | 340/995 |
| 5,270,959 | 12/1993 | Matsuzaki et al. | 364/453 |
| 5,276,626 | 1/1994 | Ihara et al. | 340/988 |
| 5,278,424 | 1/1994 | Kagawa | 364/450 |

Primary Examiner—Gary Chin
Attorney, Agent, or Firm—Sughrue, Mion, Zinn, Macpeak & Seas

[57] ABSTRACT

A navigation apparatus performs operations for detecting and indicating at least the driving direction of a moving vehicle. The apparatus comprises an angular velocity sensor for detecting an angular velocity according to a change in driving direction of the moving vehicle and outputting angular velocity data; a direction sensor for outputting direction data corresponding to a change in the driving direction of the moving vehicle. The apparatus further includes straight-movement offset reset means for detecting a straight travelling status of the moving vehicle from at least the angular velocity data and direction data, and for, when the moving vehicle is moving straight, setting a reference value of the output of the angular velocity sensor as an output value for that time. According to another aspect of the invention, the apparatus comprises gain correction means for comparing the amount of an angular change of the driving direction, calculated from the output of the angular velocity sensor, with the amount of an angular change of the driving direction, calculated from the output of the direction sensor, and correcting the output of the angular velocity sensor in accordance with the difference therebetween.

2 Claims, 7 Drawing Sheets

Fig. 4
ANGULAR VELOCITY OUTPUT (RUNNING STRAIGHT)

Fig. 5
ANGULAR VELOCITY (RATE OF CHANGE IN $\omega$)

Fig. 6
ANGLE BY GEOMAGNETISM

Fig. 7
RATE OF CHANGE IN GEOMAGNETIC ANGLE (ANGULAR VELOCITY)

Fig. 8
RELATION BETWEEN TURNING SPEED AND ANGULAR VELOCITY

Fig. 9
VEHICLE'S VELOCITY

NAVIGATION APPARATUS

BACKGROUND OF THE INVENTION

1. Field of the Invention

The present invention relates to a navigation apparatus that indicates and displays the current location and the driving direction of a moving vehicle, to help in driving the moving vehicle, and, more particularly, to a navigation apparatus capable of offset processing operations, equipped with an angular velocity sensor such as a gyro and compensates for the angular velocity output.

2. Description of Background Information

A navigation apparatus that is to be installed in a vehicle or the like, due to its nature, should accurately measure the location and driving direction of the vehicle, and properly and promptly display map information corresponding to the vehicle's location or the current position, as well as a mark representing the vehicle's location and a mark representing the driving direction or other information associated with a request from the user as needed, to present the information to the driver.

The location and driving direction of a vehicle are generally measured by two ways: by calculation based on radio waves received from a GPS (Global Positioning System) satellite (hereinafter called "GPS measuring") and by calculation based on the detection outputs from sensors, such as a direction sensor, e.g., an angular velocity sensor such as a gyro, a geomagnetic sensor, and a running sensor for detecting the running status (hereinafter called "independent measuring"). The GPS measuring is very effective means because it has a lot of advantages; for example, it does not require to set the location of a vehicle on a map in advance, and has a considerably small error in measuring the position, thus ensuring high reliability.

However, the GPS measuring has a shortcoming that the position measuring is not possible at locations surrounded by buildings, in tunnels and behind woods and forests. The independent measuring does not always provide accurate detection data because it is liable to the influence of accumulative error or a temperature change, and the conditions inside and outside the vehicle. Particularly, the geomagnetic sensor is easily affected on iron bridges. In this respect, neither position measuring is perfect. Therefore, at present, the GPS measuring and independent measuring are used in combination to compensate for each other's shortcomings to improve the precision.

An angular velocity sensor, such as a gyro, conventionally used in the independent measuring changes its output with a variation in temperature and humidity. Since the angular velocity of a stopped vehicle should be "0" in normal running, naturally, the output value in this state is treated as an offset value or a reference value and, thereafter, the true angular velocity compensation for an output variation is produced by subtracting the offset value from the output value. This calculation will be hereinafter referred to as "offset reset".

Figure 1:
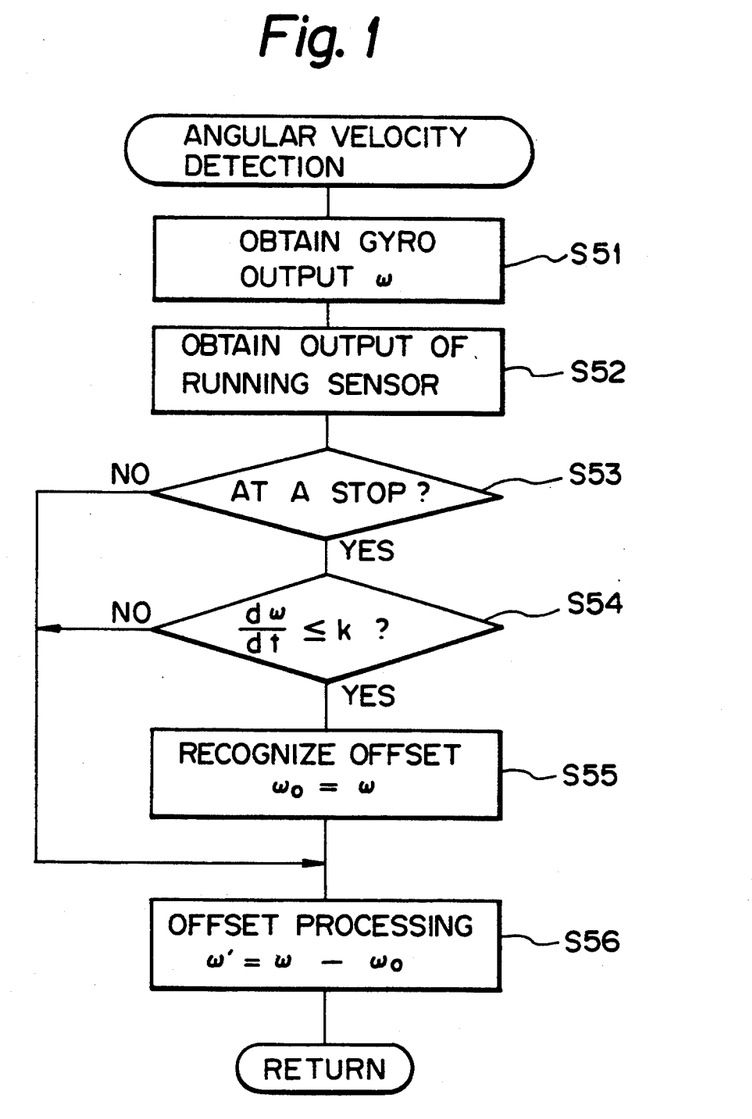
FIG. 1 is a flowchart of the conventional angular velocity detecting process.

FIG. 1 shows a flowchart of a conventional process of detecting the angular velocity. This process is performed when the angular velocity is regularly acquired from an angular velocity sensor such as a gyro to detect the driving direction. Referring to this flowchart, the conventional angular velocity detection process will be described in detail. The angular velocity $\omega$ output from the angular velocity sensor as well as the output of a running sensor which outputs a velocity pulse when the vehicle is running are acquired, and it is then determined based on those outputs if the vehicle is not moving (steps S51 to S53). When the vehicle is at a stop, it is determined if the rate of change in angular velocity $\omega$ or the angular acceleration $d\omega/dt$ is within a predetermined value k (step S54). When the angular acceleration $d\omega/dt$ is within a predetermined value k, the angular velocity $\omega$ currently acquired is considered as an offset value $\omega_0$ (step S55). This offset value $\omega_0$ is subjected to an offset processing or offset reset given in the subsequent step S56, and the angular velocity ($\omega' = \omega - \omega_0$) after the compensation becomes equal to "0". On the other hand, when the vehicle is running and the angular acceleration $d\omega/dt$ exceeds the predetermined value k, the process goes to step S56 without updating the offset value $\omega_0$, and the offset process is performed with the previously determined offset value to provide the compensated angular velocity $\omega'$.

The offset reset in the offset process will be expressed by the following equations:
Given that
$\omega_T$: true angular velocity,
$\omega$: output of the angular velocity sensor,
$\omega_{off}$: offset value, and
$\omega_{stop}$: output of the angular velocity sensor when the vehicle is stationary
As $$\omega = \omega_T + \omega_{off},$$

$$\omega_T = \omega - \omega_{off} \qquad (A)$$

Because $\omega T = 0$ should be met when the vehicle is stationary, $$\omega_{stop} = \omega_T + \omega_{off} = \omega\text{off}$$

and substituting this into the equation (A) yields $$\omega_T = \omega - \omega_{stop}$$

Thus, the true angular velocity is acquired by subtracting the output value for the stopped vehicle from the angular velocity output from the angular velocity sensor, conventionally.

Meantime, the gyro detects the angular velocity according to a change in driving direction. A change-computed angle per unit output (hereinafter called "gyro gain") is obtained in advance, and a driving direction change is computed from the gyro data output from the gyro using that gyro gain. The gyro gain is determined from the following equation (1) based on the gyro data that is accumulated while the vehicle turns 360° when correcting the turn.
Given that
G: gyro gain,
$J_i$: gyro data and
$J_{ofs}$: gyro offset value, $$G = \frac{360°}{\left| \sum_{0°}^{360°} (J_i - J_{ofs}) \right|} \qquad (1)$$

The direction computed using this gyro gain G (hereinafter called "gyro direction") has been obtained from the following equation.
Given that $\Delta\theta a_n$: relative gyro direction,
$\theta a_n$: gyro direction,
$\theta o_{n-1}$: previous absolute direction, and
gk: gyro gain correction coefficient (fixed to 1), the gyro direction $\theta a_n$ is $$\begin{aligned}\theta a_n &= \theta o_{n-1} + \Delta\theta a_n \qquad (2)\\ &= \theta o_{n-1} + (J_1 - J_{ofs}) \times G \times gk\end{aligned}$$

In this equation the gyro offset $J_{ofs}$ is reset, at appropriate timings, by using as an offset value the gyro data detected when no change in driving direction occurs as in the case where the vehicle is not moving. The previous absolute direction $\theta o_{n-1}$ is the gyro direction previously acquired, and the relative gyro direction $\Delta\theta a_n$ is a newly obtained angle of direction change.

In the above-described conventional offset reset process, however, when a vehicle runs on an ordinary road, the vehicle frequently stops by a signal or the like and the offset reset is performed at every occasion of stopping, so that the true angular velocity is acquired with a considerably small error. When the vehicle runs for a long period of time without stopping as on an expressway, however, the offset value is not obtained naturally. In this case, the offset value is likely to vary during that period due to a change in temperature and humidity and an error may occur in the obtained angular velocity, resulting in the calculation of the wrong driving direction, posing a problem for solution.

In addition, as the gyro gain correction coefficient gk is fixed to "1" and the gyro gain once determined is used without being changed in the conventional calculation of the gyro direction, the gyro gain would vary due to the influence of the operational environment (temperature, humidity and so forth) of the gyro, thus lowering the precision of the computed gyro direction.

Even when a gyro which has as small a variation in gyro gain as negligible and is not affected so much by the operational environment is used, data about the 360° turn in the turn correction is obtained from another sensor, so that the acquired data often does not match the data which would be obtained when actual 360° turn is made. In such cases, therefore, there is an error between the determined gyro gain and the gain of the gyro in actual use, and this error lowers the precision of the calculated gyro direction.

OBJECTS AND SUMMARY OF THE INVENTION

It is therefore a primary object of the present invention to provide a navigation apparatus designed to properly perform the accurate offset reset to detect the angular velocity with high precision even when a vehicle runs without a stop for a long period of time, so that it can always acquire the accurate bearings of the vehicle.

It is another object of this invention to provide a navigation apparatus which improves the precision of the calculated driving direction from an angular velocity sensor by compensating the gain of the angular velocity sensor of a gyro or the like to the proper value from the acquired data at any time, thereby presenting more accurate bearings.

To achieve the foregoing objects, according to the first aspect of the present invention, there is provided a navigation apparatus for detecting and indicating at least the driving direction of a moving vehicle, comprising an angular velocity sensor for detecting an angular velocity according to a change in driving direction of the moving vehicle and outputting angular velocity data; a direction sensor for outputting direction data corresponding to a change in the driving direction of the moving vehicle; and straight-movement offset reset means for detecting a straight travelling status of the moving vehicle from at least the angular velocity data and direction data, and for, when the moving vehicle is moving straight, setting a reference value of the output of the angular velocity sensor as an output value for that time.

According to the second aspect of the present invention, the navigation apparatus of the first aspect is modified to detect the current location and driving direction and indicate them together with map information as well as to determine if the moving vehicle is moving straight from the map information and set a reference value of the output of the angular velocity sensor. In other words, the navigation apparatus for detecting and indicating at least the current location and driving direction of a moving vehicle together with map information, comprises an angular velocity sensor for detecting an angular velocity according to a change in driving direction of the moving vehicle and outputting angular velocity data; a direction sensor for outputting direction data corresponding to a change in the driving direction of the moving vehicle; and straight-movement offset reset means for detecting a straight travelling status of the moving vehicle from at least the angular velocity data, the direction data and the map information, and for, when the moving vehicle is moving straight, setting a reference value of the output of the angular velocity sensor as an output value for that time.

If a moving vehicle is found to be at a stop when detecting the driving direction of the moving vehicle, the navigation apparatus of the first aspect of this invention performs an offset reset operation to set the output of the angular velocity sensor obtained when the vehicle is not moving, as a reference value (offset value). Even with the moving vehicle in motion, the straight-movement offset reset means always monitors the outputs of the angular velocity sensor and direction sensor, detects if the moving vehicle is travelling straight, for example, using the rate of change in angular velocity data and the rate of change in direction data, and, if the moving vehicle is moving straight, executes an offset reset taking the output value of the angular velocity sensor as an offset value for that motion. The last action is premised on the basis that there is no angular velocity in straight movement. The above feature allows an offset reset to be conducted in straight movement even when the moving vehicle is moving for a long period of time without stopping on an expressway or the like to always detect the angular velocity with high precision, thereby providing the accurate driving direction of the moving vehicle.

In the navigation apparatus of the second aspect of this invention, the straight-movement offset reset means detects if the moving vehicle is travelling straight from the outputs of the angular velocity sensor and direction sensor, and further based on map information, such as vector information of the road the moving vehicle is currently on. Only when those three detection outputs indicate the straight movement of the moving vehicle, an offset reset is performed so as to set the offset value of the angular velocity sensor as an output value for that case. Even if there are errors in the outputs of the angular velocity sensor and direction sensor due to some reasons, therefore, the straight travelling motion can still be confirmed by the map information. This prevents an error-originated offset reset and ensures a highly accurate offset reset.

To achieve the second object, according to the third aspect of the present invention, there is provided a navigation apparatus for detecting and indicating at least the driving direction of a moving vehicle, comprising an angular velocity sensor for detecting and outputting an angular velocity according to a change in driving direction of the moving vehicle; a direction sensor for detecting and outputting the driving direction of the moving vehicle; and gain correction means for comparing the amount of an angular change of the driving direction, calculated from the output of the angular velocity sensor, with the amount of an angular change of the driving direction, calculated from the output of the direction sensor, and correcting the output of the angular velocity sensor in accordance with the difference therebetween.

In the navigation apparatus of the third aspect, the gain correction means compares the amount of an angular change of the driving direction, calculated from the regularly-obtained output of the angular velocity sensor, with the amount of an angular change of the driving direction, calculated from the output of the direction sensor, which is likewise acquired regularly. When the former angular change acquired by the angular velocity sensor is smaller than the latter, for example, correction is made to increase the value of the change-computed angle per unit output of the angular velocity sensor or the gain in accordance with the difference, and when the former angular change is larger, on the other hand, the gain is corrected to become smaller in accordance with the difference. That is, the gain correction is performed to set the amounts of both angular changes equal to each other.

This feature can correct the gain of the angular velocity sensor to the proper value at any time even when that gain varies due to the operational environment. Further, even if the first gain set is in error, the gain is corrected to the proper value to provide a highly accurate direction of movement.

DETAILED DESCRIPTION OF THE PREFERRED EMBODIMENT

A preferred embodiment of the present invention will now be described referring to the accompanying drawings.

Figure 2:
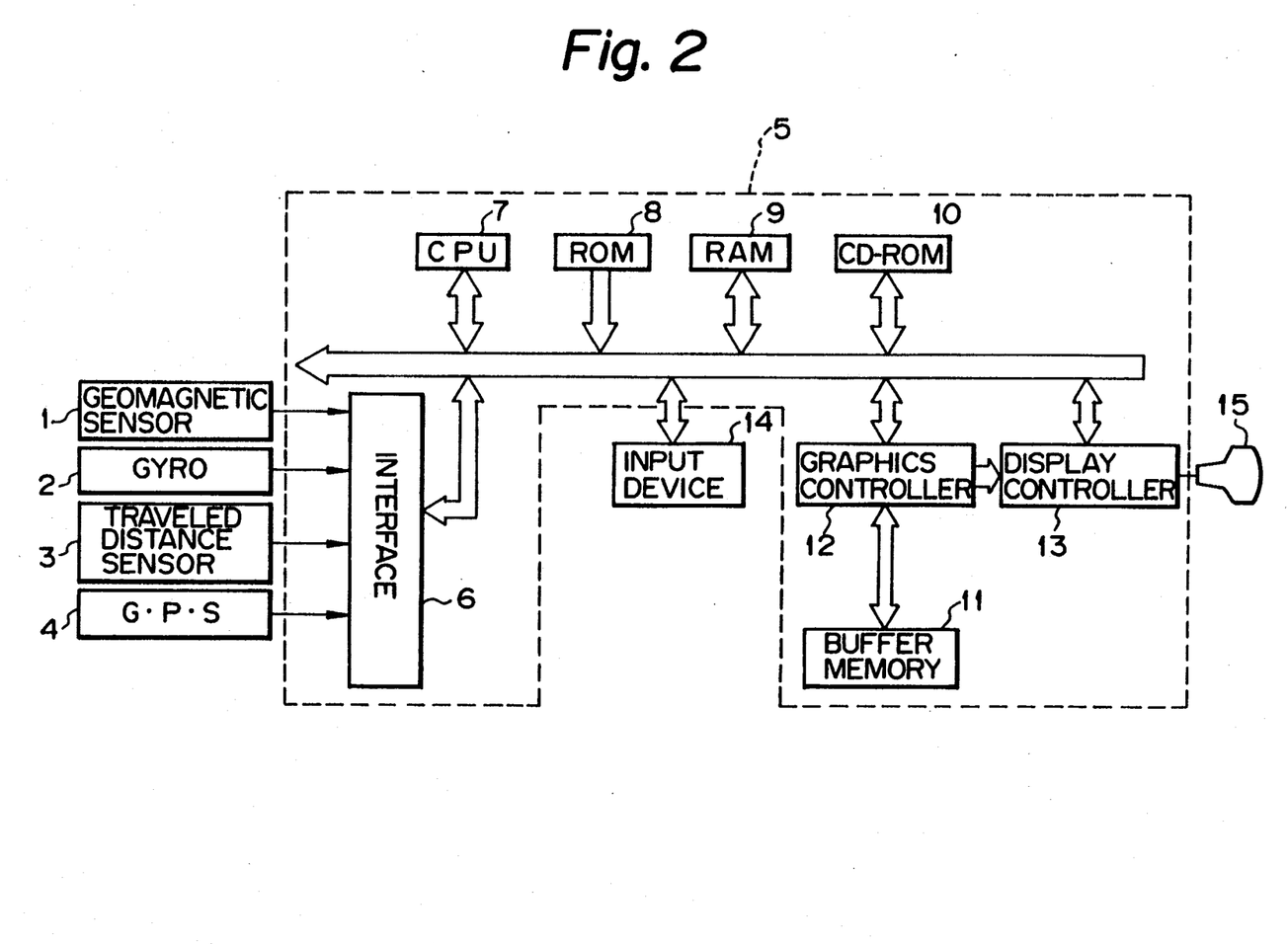
FIG. 2 is a diagram showing the structure of a navigation apparatus to be installed on a vehicle according to one embodiment of the present invention.

FIG. 2 shows the structure of an on-vehicle navigation apparatus according to one embodiment of the present invention. As illustrated, the navigation apparatus includes a geomagnetic sensor 1 as a direction sensor, a gyro 2 as an angular velocity sensor, a traveled distance sensor 3, a GPS measuring instrument 4, a system controller 5 for performing various processes, such as operations and control, an input device 14 for inputting instructions to the system controller 5, and a display 15 of, for example, a liquid crystal type or a CRT type. The geomagnetic sensor 1 outputs absolute azimuth angle data of a vehicle based on geomagnetism (magnetic field of the earth). The gyro 2 detects an angular velocity according to a change in the direction of the vehicle and outputs angular velocity data. The traveled distance sensor 3 detects whether or not the vehicle is moving, and outputs data of that status and data of the running speed and travelled distance of the vehicle. The GPS measuring instrument 4 performs operations based on radio waves received from a plurality of GPS satellites to produce data on the latitude, longitude, altitude and driving direction.

The system controller 5 comprises an interface 6, a CPU (Central Processing Unit) 7, a ROM (Read Only Memory) 8, a RAM (Random Access Memory) 9, a recording medium 10, a buffer memory 11, graphics controller 12, and a display controller 13. The interface 6 receives the outputs of the geomagnetic sensor 1, gyro 2, traveled distance sensor 3 and GPS measuring instrument 4 and performs A/D conversion, etc. on the inputs. The CPU 7 executes various operations and control according to a program. The ROM 8 has various process programs and necessary information previously written therein. Information necessary to run a program is written into or read from the RAM 9. The recording medium 10, such as a CD-ROM or an IC card, has digitized map information or the like recorded. The buffer memory 11 comprising a V-RAM (video RAM) or the like is a frame buffer to temporarily store image information mapped in an instantly displayable form. The graphics controller 12 draws received graphics data such as map information into the buffer memory 11 and outputs the drawn data as image information in response to an instruction from the CPU 7. The display controller 13 receives the image information from the graphics controller 12 and controls the image display on the display 15.

When the thus constituted navigation apparatus is activated, the system controller 5 reads information for accessing map information or the like and display information of the vehicle's position mark from the recording medium 10 and stores this information into the RAM 9. Then, the system controller 5 reads latitude and longitude data, as positional information of the vehicle, and direction data thereof from the GPS measuring instrument 4, reads map data corresponding to the vehicles's location from the recording medium 10, sends the data to the graphics controller 12 and displays the map of the current location on the display 15. In addition, the system controller 5 performs a process to display the vehicle's position mark on the map based on the information of the vehicle's location and driving direction, and regularly reads the information of the vehicle's location and direction data from the GPS measuring instrument 4. On the basis of this information, the system controller 5 updates the display position of the vehicle's position mark, the driving direction and the to-be-displayed map, if necessary.

Figure 3:
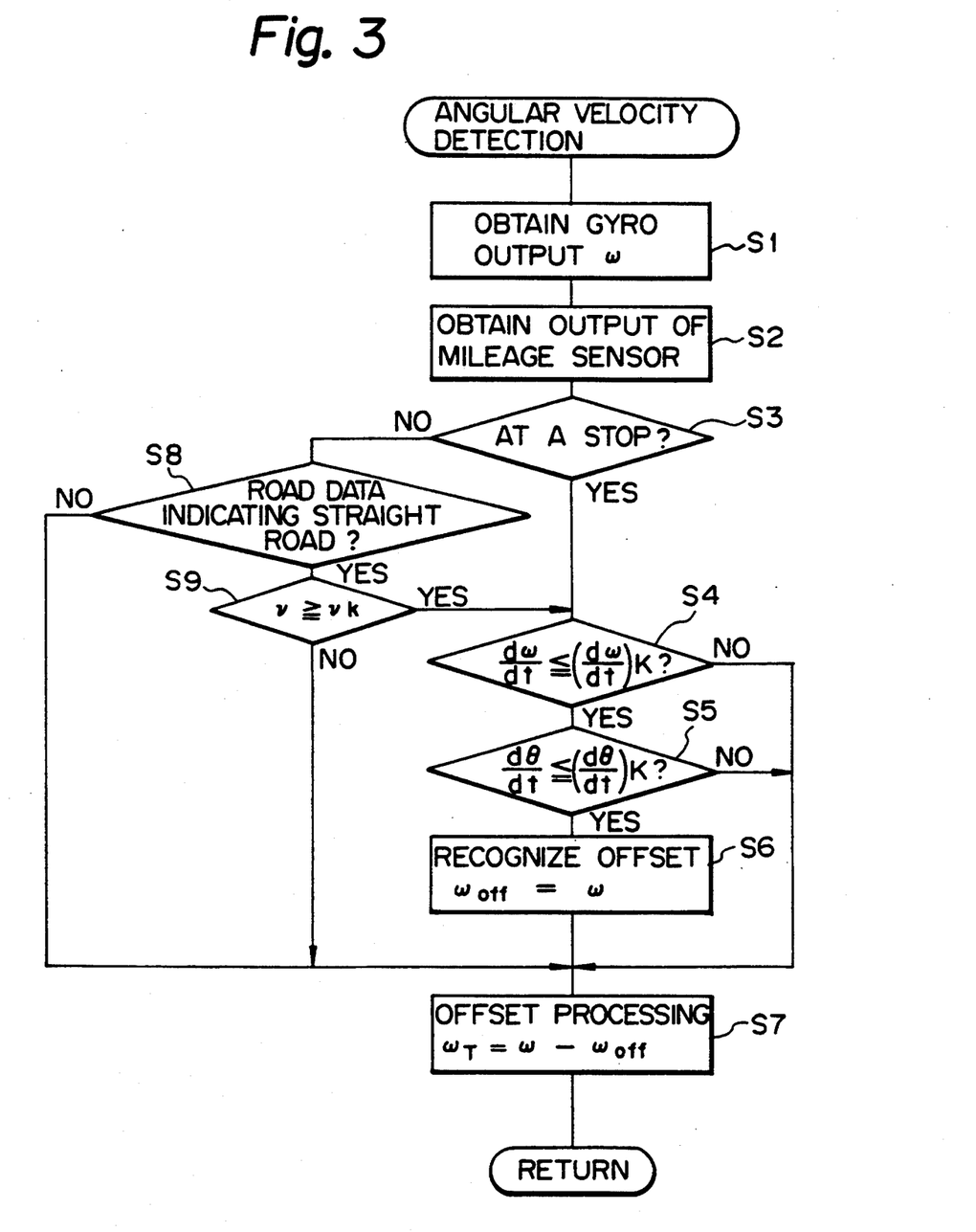
FIG. 3 is a flowchart of an angular velocity detecting process according to this embodiment.

The system controller 5 also periodically reads the output data from the geomagnetic sensor 1, gyro 2 and traveled distance sensor 3, performs a predetermined operation on the output data to calculate the vehicle's location and driving direction, compares the calculated data with the data from the GPS measuring instrument 4 and adjusts an error therebetween to try setting both data equal to each other. The computation of the driving direction from the output data of the geomagnetic sensor 1, gyro 2 and traveled distance sensor 3 is computed from the angular velocity that is acquired in the angular velocity detecting process shown in FIG. 3. The flowchart shown in FIG. 3 illustrates the angular velocity detection that is executed by the system controller 5 and includes the straight-movement offset reset means of the present invention. In the angular velocity detection of this embodiment, an offset reset is performed when the vehicle is running straight as well as when it is not moving.

Figures 4, 5, 6:
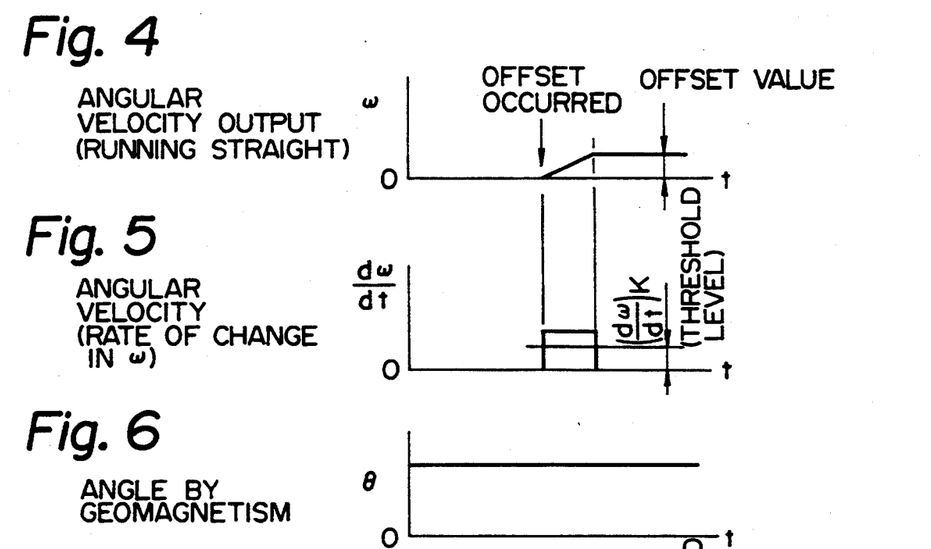
FIGS. 4 through 9 are diagrams for explaining the angular velocity detection according to this embodiment.

FIGS. 4 through 9 are exemplary diagrams for the angular velocity $\omega$ output from the gyro 2 when the vehicle is running straight and the absolute direction $\theta$ output from the geomagnetic sensor 1. FIG. 4 shows an example of the output angular velocity $\omega$ of the gyro 2 for the vehicle running straight; it shows that an offset is generated during the motion due to a change in temperature and humidity, etc. and the offset value becomes constant after a certain time. When such an offset occurs, the angular velocity $\omega$ used in the computation of the driving direction contains the later-produced offset value, making the computed driving direction inaccurate.

FIG. 5 illustrates the rate of change in the output angular velocity $\omega$ in FIG. 4, i.e., a change in the angular acceleration $d\omega/dt$. Before the occurrence of the offset and after the offset value becomes constant, the rate of change is naturally almost 0, below the threshold level $(d\omega/dt)k$ as illustrated in the diagram. The rate of change becomes greater than the threshold level $(d\omega/dt)k$ either when the angular velocity has changed due to a change in the vehicle's driving direction or when the offset has changed as in FIG. 4. While the vehicle is running, therefore, an offset reset should not be performed when the rate of change in the output angular velocity $\omega$ of the gyro 2 is above the threshold level $(d\omega/dt)k$.

FIG. 6 shows the absolute azimuth angle $\theta$, the output of the geomagnetic sensor 1 when the vehicle is moving straight. As illustrated, $\theta$ is constant in straight movement.

Figure 7:
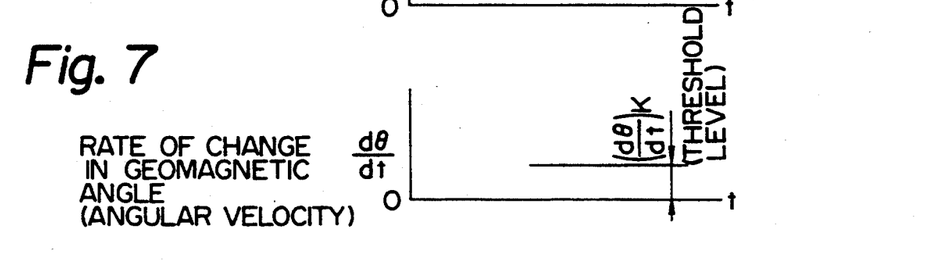

FIG. 7 gives the rate of change $d\theta/dt$ (angular velocity) of the absolute azimuth angle $\theta$ from the geomagnetic sensor 1 when the vehicle is travelling straight. Because $\theta$ is constant as shown in FIG. 6, the rate of change is of course nearly 0, under the illustrated threshold level $(d\theta/dt)k$. The rate of change becomes greater than the threshold level $(d\theta/dt)k$ when the vehicle's driving direction has changed. When the vehicle is turning at a constant angular velocity, the rate of change in the output angular velocity $\omega$ of the gyro 2 is approximately 0 while the rate of change in the output $\theta$ of the geomagnetic sensor 1 is above the threshold level $(d\theta/dt)k$. If the rate of change in the output $\omega$ of the gyro 2 is below the threshold level $(d\omega/dt)k$ and when the rate of change in the output $\theta$ of the geomagnetic sensor 1 is below the threshold level $(d\theta/dt)k$, it is considered that the vehicle is moving straight and there is no change in angular velocity, so that an offset reset can be performed even during running.

Figure 8:
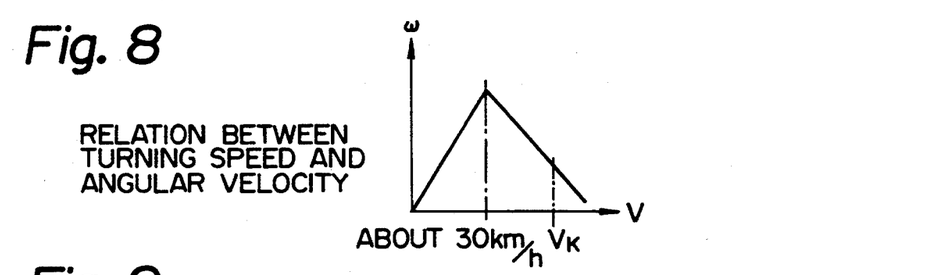
Figure 9:
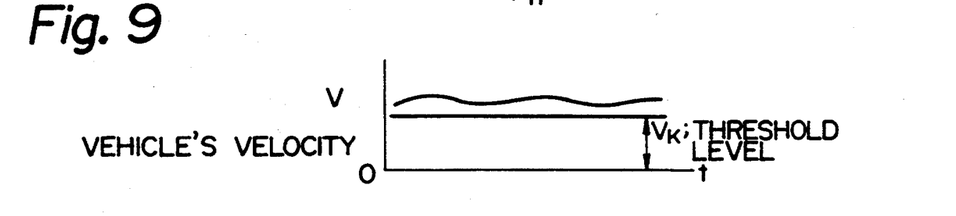

FIG. 8 illustrates the relation between the velocity V and angular velocity $\omega$ when the vehicle is turning. As shown in this diagram, the angular velocity $\omega$ becomes the greatest when the velocity is around 30 Km/h and a very large angular velocity $\omega$ does not appear as the velocity V becomes faster. Therefore, the offset reset during running can be made surer by setting the threshold level $V_K$ of the vehicle's velocity V as shown in FIG. 9 and permitting no offset reset when the velocity V is below the threshold level $V_K$.

According to this embodiment, even when the vehicle is moving, an offset reset is performed in the angular velocity detecting process due to the above judgment, thus improving the accuracy of the angular velocity to be detected. Referring now to the flowchart in FIG. 3, the angular velocity detection of this embodiment will be described.

In the angular velocity detection of this embodiment, the angular velocity $\omega$ from the gyro 2 and the output of the traveled distance sensor 3 are acquired, and based on which it is determined if the vehicle is not moving (steps S1 to S3). When the vehicle is not moving, the rate of change in angular velocity $\omega$ from the gyro 2 or the angular acceleration $d\omega/dt$ is obtained based on the previously acquired data (step S4) and it is determined if the angular acceleration $d\omega/dt$ is below the threshold level $(d\omega/dt)k$ (step S4). Consequently, if the angular acceleration $d\omega/dt$ is below the threshold level $(d\omega/dt)k$, the absolute azimuth angle $\theta$ is acquired from the geomagnetic sensor 1, the rate of change in absolute azimuth angle $\theta$ (angular velocity) $d\theta/dt$ is obtained based on the previously acquired data, and it is determined if that rate of change $d\theta/dt$ is below the threshold level $(d\theta/dt)k$ (step S5). If the rate of change $d\theta/dt$ is below the threshold level $(d\theta/dt)k$, the reference value (offset value) of the output of the gyro 2, $\omega_{off}$, is taken as the currently acquired angular velocity $\omega$ ($\omega_{off}=\omega$; step S6). When this offset value $\omega_{off}$ is reset, the true angular velocity ($\omega_T=\omega-\omega_{off}$) becomes "0" through the offset process in the next step S7.

If the decision in step S3 is such that the vehicle is running, it is determined if the road the vehicle is now on is straight from road data of map information (vector information) (step S8). If the road is straight, the current velocity data is then obtained from the traveled distance sensor 3, and it is determined if the vehicle's velocity V is equal to or greater than a predetermined threshold level $V_K$ (step S9). When the vehicle's velocity V is equal to or greater than the threshold level $V_K$, a sequence of the offset reset decision processes from step S4 is executed as done in the previous case of the vehicle being not moving. In other words, even with the vehicle in motion, if the road the vehicle is on is straight and the velocity is equal to or greater than the threshold level $V_K$, the rate of change in angular velocity $\omega$ and the rate of change in absolute azimuth angle $\theta$ are computed and, if they are below the respective threshold levels, the offset reset is performed.

On the other hand, even if the vehicle is not moving, when the angular velocity $d\omega/dt$ is greater than the threshold level $(d\omega/dt)k$ in step S4 or the rate of change in absolute azimuth angle, $d\theta/dt$, is greater than the threshold level $(d\theta/dt)k$ in step S5, the offset value is not reset and the flow advances to step S7 where the offset process ($\omega_T=\omega-\omega_{off}$) is performed with the previously set offset value $\omega_{off}$ to acquire the true angular velocity $\omega_T$. Even with the vehicle in motion, when the road the vehicle is on is not straight in step S8, the velocity V is below the threshold level $V_K$ in step S9, or the rate of change in step S4 or S5 is greater than the associated threshold level, the offset value is not reset and the flow advances to step S7 where the offset process ($\omega_T = \omega - \omega_{off}$) is performed with the previously set offset value $\omega_{off}$ to acquire the true angular velocity $\omega_T$.

The offset reset is performed even during driving and the type of the road the vehicle is currently on and the vehicle's velocity are determined based on the map information in order to make the offset reset surer in this embodiment. However, even with the vehicle running, the offset reset may be executed based only on the decision on the change of rate in the output $\omega$ of the gyro 2 in step S4 and the decision on the change of rate in the output $\theta$ of the geomagnetic sensor 1 in step S5, as done in the case of the vehicle being stopped. In this case, steps S3, S8 and S9 would be unnecessary.

In recognizing the offset in step S6, the output angular velocity $\omega$ of the gyro 2 for each occasion is set as the offset value $\omega_{off}$. But, the true angular velocity may be acquired from the previous offset value and the current offset value $\omega_{off}$ that are weighed as follows, thereby reducing the influence of an erroneous offset reset. That is, given that $\omega_{off n}$: current (n-th) offset value,
$\Omega_{n-1}$: previous offset value,
$\alpha(0 \leq \alpha \leq 1)$: weight coefficient, and
$\Omega_n$: offset value to be obtained,
the target offset value $\Omega_n$ is obtained from $$\Omega_n = \alpha \Omega_{n-1} + (1-\alpha)\omega_n.$$

Then, the true angular velocity $\omega_{Tn}$ is given from $$\omega_{Tn} = \omega_n - \Omega_n.$$

Figure 10:
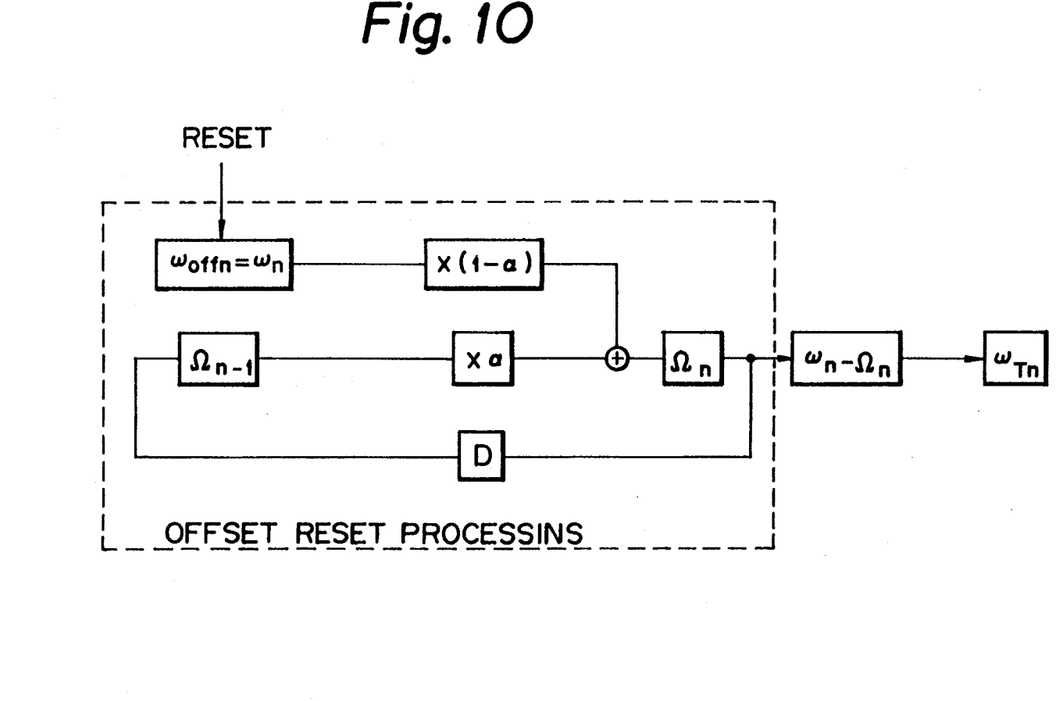
FIG. 10 is a flowchart illustrating another process of an offset reset in this embodiment.

If $\alpha = 0$ in the above equation to acquire the offset value $\Omega_n$, this process becomes the same as the offset reset process in step S6. Since the offset value $\Omega_n$ takes a value from $\Omega_{n-1}$ to $\omega_{off}$ depending on $\alpha$, as $\alpha$ increases, the effect of the offset reset gradually becomes smaller while the influence of an erroneous offset reset is reduced. FIG. 10 shows a flowchart of the above offset reset process. In this flowchart, D represents a delay process to set the determined offset value $\Omega_n$ as the previous offset value $\Omega_{n-1}$ in the next offset reset.

While a gyro or the like is used as an angular velocity sensor in the above embodiment, it is not limited to this type. For instance, the same effect can be achieved by a sensor that detects the driving direction from the difference between the numbers of rotations of wheels or a sensor that employs an optical fiber system to detect the driving direction.

As described above, this invention detects the status of the straight movement to properly perform an offset reset even when a vehicle is driving for a long period of time without stopping, and can thus provide a navigation apparatus that detects the angular velocity with high precision to always obtain the accurate driving direction.

The following will describe how the output of the angular velocity of the navigation apparatus of this invention constituted as shown in FIG. 2 is corrected.

The output data of the geomagnetic sensor 1, gyro 2 and traveled distance sensor 3 are periodically read out, the location and driving direction of the vehicle are computed through a predetermined operation based on those data, the calculated data is compared with the data from the GPS measuring instrument 4, and the difference therebetween is adjusted to set both data equal to each other.

While the driving direction to be calculated based on the output of the gyro 2 is acquired from the aforementioned equation (2), a gyro gain correction coefficient gk is updated at any time in a process serving as gain correction means in this embodiment. More specifically, the gyro gain correction coefficient gk is updated to correct the gyro gain G in such a way that the relative driving direction (the amount of a change in angle) obtained from the output of the gyro 2 becomes equal to the relative driving direction (the amount of a change in angle) obtained from the output of the geomagnetic sensor 1. The renewal of the gyro gain correction coefficient gk is basically performed by the following equation (3).
Given that
$\Delta\theta m$: relative magnetic direction,
$\Delta\theta a$: relative gyro direction, and
$\kappa$: constant (0 to 1), $$gk_n = gk_{n-1} + \kappa \times \frac{(\Delta\theta m_n - \Delta\theta a_n)}{\Delta\theta a_n} \quad (3)$$

That is, the difference between the relative magnetic direction $\Delta\theta m_n$ or the new amount of a change in angle acquired from the output of the geomagnetic sensor 1 and the relative magnetic direction $\Delta\theta a_n$ or the new amount of a change in angle acquired from the output of the gyro 2 is obtained, the ratio of the difference to the relative magnetic direction $\Delta\theta a_n$ is calculated and is then multiplied by the constant $\kappa$, and the resultant value is added to the previously obtained gyro gain correction coefficient $gk_{n-1}$ to yield a new gyro gain correction coefficient $gk_n$.

If the amount of angular change acquired from the gyro 2 is smaller than that acquired from the geomagnetic sensor 1, the ratio of the difference to $\Delta\theta a_n$ is positive so that the new gyro gain correction coefficient $gk_n$ becomes larger than the previous one. Thus the value of the gyro gain G is corrected to be slightly larger, so that the calculated amount of angular change becomes larger even when the outputs of the gyro 2 are the same. If the amount of angular change acquired from the gyro 2 is larger than that acquired from the geomagnetic sensor 1, the value of the gyro gain G is corrected to be slightly smaller, so that the calculated amount of angular change becomes smaller even when the outputs of the gyro 2 are the same. The gyro gain G is corrected in this manner to set the amount of angular change acquired from the gyro 2 equal to that acquired from the geomagnetic sensor 1.

As the amount of angular change becomes 0 when the vehicle is moving straight, however, the gyro gain correction coefficient cannot be determined in the above equation (3). Even with the vehicle making a turn, the amount of change in one sample period is small so that the error becomes significantly larger due to the influence of the disturbance on the geomagnetic sensor 1. In this embodiment, therefore, the gyro gain correction coefficient gk is updated as shown in the following equations (4) and (5) only when the sum of the amounts of angular change over a previous certain period T, not just the amount of one sample period, exceeds a given angle.

$$gk_n = gk_{n-1} + \kappa \times \frac{\sum_{i=0}^{T} \Delta\theta m_{n-i} - \sum_{i=0}^{T} \Delta\theta a_{n-i}}{\sum_{i=0}^{T} \Delta\theta a_{n-i}} \quad (4)$$

$$\left( \text{when } \left| \sum_{i=0}^{T} \Delta\theta a_{n-i} \right| \geq \theta_k \right)$$

$$gk_n = gk_{n-i} \quad (5)$$

$$\left( \text{when } \left| \sum_{i=0}^{T} \Delta\theta a_{n-i} \right| < \theta_k \right)$$

Figure 11:
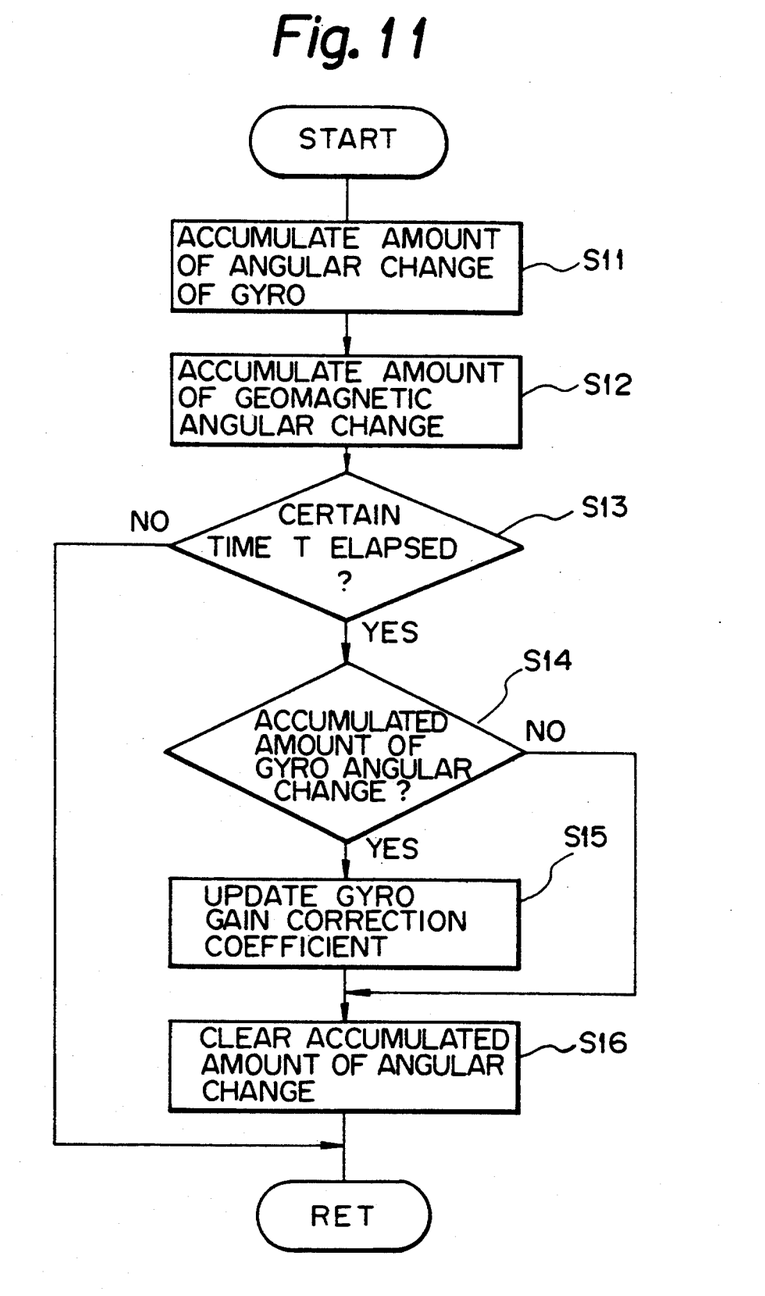
FIG. 11 is a flowchart of a process of updating a gyro gain correction coefficient in this embodiment.

FIG. 11 illustrates a flowchart of the above process of updating the gyro gain correction coefficient. This process is invoked and performed every sample period. As illustrated in this flowchart, first, the amount of angular change $\Delta\theta a$ is computed from the output of the gyro 2 and is accumulated to the previous sum, and likewise the amount of angular change $\Delta\theta m$ is computed from the output of the geomagnetic sensor 1 and is accumulated to its previous sum (steps S11 and S12). Then, it is discriminated if a certain period T for determining the renewal has elapsed (step S13). If the time T has not elapsed, the process will terminate without making the renewal decision. If the certain time T has elapsed, it is determined if the accumulated amount of angular change is equal to or larger than a given angle $\theta_k$ (step S14). When the accumulated amount of angular change is equal to or larger than a given angle $\theta_k$, the calculation of the equation (4) is performed to update the gyro gain correction coefficient to a new one $gk_n$ (step S15). Then, the accumulated amounts of angular change of both the gyro 2 and geomagnetic sensor 1 are cleared and the time T for renewal decision is reset (step S16) before terminating this subroutine to prepare for the next renewal decision. If the accumulated amount of angular change is found smaller than the given angle $\theta_k$ in step S14, the renewal process will not be performed as apparent from the above equation (5) and the flow advances to step S16 to execute the same process for the next renewal decision before this subroutine is terminated. The gyro gain correction coefficient $gk_n$ obtained here is given in the computation of the gyro direction in the aforementioned equation (2).

Figure 12:
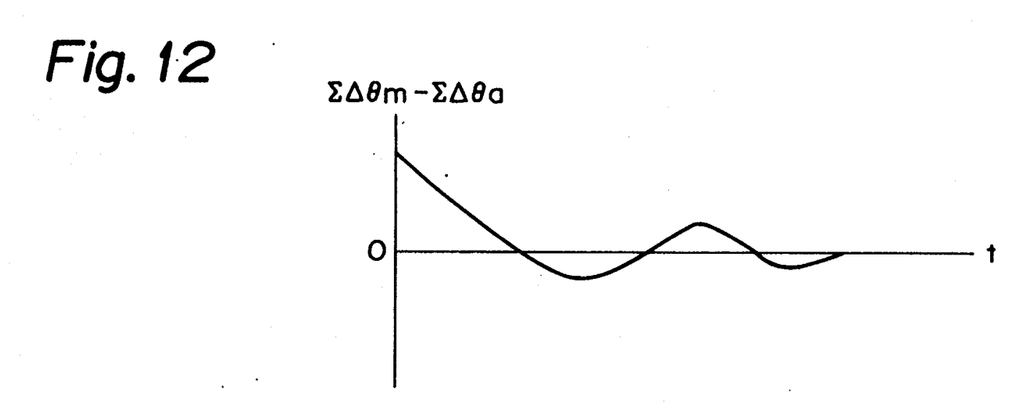
FIGS. 12 and 13 are diagrams for explaining the renewal of the gyro gain correction coefficient in this embodiment.
Figure 13:
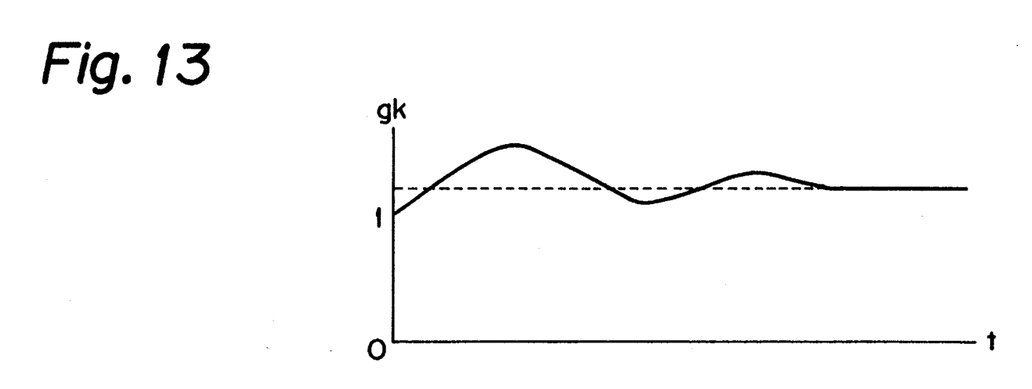

FIGS. 12 and 13 present exemplary diagrams for renewing the gyro gain correction coefficient gk. FIG. 12 shows a change in the difference between the accumulated amount of angular change $\Sigma\theta m$ acquired from the geomagnetic sensor 1 and the accumulated amount of angular change $\Sigma\theta a$ acquired from the gyro 2. FIG. 13 shows a change in gyro gain correction coefficient gk that is updated in accordance with the change in the difference between those two accumulated amounts of angular change. As apparent from the diagrams, when $\Sigma\theta m - \Sigma\theta a > 0$, the renewal is performed to increase the gyro gain correction coefficient gk, whereas when $\Sigma\theta m - \Sigma\theta a < 0$, the renewal is performed to decrease gk, so that eventually the gyro gain correction coefficient gk converges to a certain value.

In short, according to this embodiment, the gyro gain correction coefficient gk is updated at any time to correct the gyro gain G in such a way as to set the amount of angular change acquired from the output of the gyro 2 equal to that acquired from the output of the geomagnetic sensor 1. Even if the gyro gain varies due to an environmental change or the like, therefore, the gyro gain is corrected, at any time, to the proper value to cancel the influence. If the set gain value differs from the gain value of the gyro in actual use, the influence of the error is canceled by the gain correction, so that the highly accurate driving direction can be calculated.

While the geomagnetic sensor is used as a direction sensor in the above embodiment, it is not limited to this type. For instance, the same effect can be achieved by a sensor that detects the driving direction from the difference between the numbers of rotations of wheels.

In short, the present invention can provide a navigation apparatus, which can correct the gain of an angular velocity sensor such as a gyro to the proper value at any time based on the amount of angular change of the driving direction computed from the output of the angular velocity sensor and the amount of angular change of the driving direction computed from the output of a direction sensor, and thus eliminate the influence of an environmental change or the like and an error in the set value, thereby providing more accurate bearings.

What is claimed is:

1. In a navigation apparatus for detecting and indicating at least a driving direction of a moving vehicle, comprising an angular velocity sensor for detecting an angular velocity according to a change in driving direction of the moving vehicle and outputting angular velocity data; and a direction sensor for outputting direction data corresponding to a change in the driving direction of the moving vehicle, wherein the improvement comprises: straight-movement offset reset means for detecting a straight travelling status of the moving vehicle from at least the angular velocity data and direction data, and for, when the moving vehicle is moving straight, setting an offset value equal to the output of the angular velocity sensor.

2. In a navigation apparatus for detecting and indicating at least a current location and a driving direction of a moving vehicle together with map information, comprising an angular velocity sensor for detecting an angular velocity according to a change in driving direction of the moving vehicle and outputting angular velocity data; and a direction sensor for outputting direction data corresponding to a change in the driving direction of the moving vehicle, wherein the improvement comprises: straight-movement offset reset means for detecting a straight travelling status of the moving vehicle from at least the angular velocity data, the direction data and the map information, and for, when the moving vehicle is moving straight, setting an offset value equal to the output of the angular velocity sensor.

* * * * *